United States Patent [19]

Bryden

[11] Patent Number: 5,432,756
[45] Date of Patent: Jul. 11, 1995

[54] ZEBRA MUSSEL (DREISSENA POLYMORPHA) AND OTHER AQUATIC ORGANISM CONTROL

[75] Inventor: Arthur D. Bryden, Vancouver, Canada

[73] Assignee: 1008786 Ontario Limited, Canada

[21] Appl. No.: 972,441

[22] PCT Filed: Jul. 31, 1991

[86] PCT No.: PCT/CA91/00269

§ 371 Date: Jan. 29, 1993

§ 102(e) Date: Jan. 29, 1993

[87] PCT Pub. No.: WO92/02926

PCT Pub. Date: Feb. 20, 1992

[30] Foreign Application Priority Data

Jul. 31, 1990 [CA] Canada ................................ 2022337
Apr. 29, 1991 [CA] Canada ................................ 2041467

[51] Int. Cl.$^6$ ................... G10K 15/06; G01V 1/157; C02F 1/36
[52] U.S. Cl. ................... 367/139; 367/147
[58] Field of Search ................. 367/139, 147; 128/660.01

[56] References Cited

U.S. PATENT DOCUMENTS

| | | | |
|---|---|---|---|
| 4,039,042 | 8/1977 | Edwards et al. | 181/106 |
| 4,734,894 | 3/1988 | Cannelli et al. | 367/147 |
| 4,764,906 | 8/1988 | Clements et al. | 367/147 |

FOREIGN PATENT DOCUMENTS

| | | | |
|---|---|---|---|
| 1268851 | 5/1990 | Canada | G01V 1/06 |
| 1497773 | 10/1969 | Germany | |
| 2010731 | 9/1970 | Germany | H03K 3/02 |
| 2348063 | 4/1975 | Germany | B06B 1/02 |
| 62-186990 | 8/1987 | Japan | C02F 1/48 |

OTHER PUBLICATIONS

G. B. Cannelli and E. D'Ottavi, "Echographic Technique–based Apparatus To Detect Structure . . . ", May 1989, pp. 946–950.
Ray Conlogue, "A Midsummer Idyll: Loons, A Lake and Cultural Survival", Jul. 9, 1991, p. E1.
Martin Mittelstaedt, "Controlling Zebra Mussels To Cost Billions Researchers Study Sound Waves, . . . ", Feb. 12, 1991, p. A4.
Donald Grant, "Dry Runs/Outfit Takes Diver To Bottom And Back Without Decompression, . . . ", Jul. 28, 1990, p. D4.
Editorial, "First The Mussels, Then What?", Jul. 9, 1990, p. A10.
Richard Mackie, "Mussels Spreading Rapidly: Officials Say Hydro Water Threatened", Jul. 5, 1990, p. A1.
Craig McInnes, "Invasion Of Mussels Threatens Lake Life, Costs Cities Millions", Oct. 9, 1989, p. A1.
Peter Gorrie, "Mussels Battle To Cost Billions Delegates Told", Feb. 12, 1991, *Toronto Star*, News Section, p. A6.
Frank B. A. Frungel, *High Speed Pulse Technology*, vol. 1, 1965, Academic Press, New York and London, pp. 519–527.
Roland Winston, "Nonimaging Optics", *Scientific American*, Mar. 1991, pp. 76–81.
Robert David Smith, "An Investigation Of The Plasma Jet As An Underwater Acoustic Source", Sep. 10, 1990, pp. 10–16.
P. L. Pitt et al., "A Pulsed Plasma Jet Acoustic Source For Profiling The Ocean Floor", *Geophysical Prospecting*, vol. 36, 523–536 (1988).
Martin, E. A., "Experimental Investigation of a High Energy Density, High Pressure Arc Plasma", J. Appl. Phys., vol. 31, #2, Feb. 1960.

*Primary Examiner*—Ian J. Lobo
*Attorney, Agent, or Firm*—Ohlandt, Greeley & Ruggiero

[57] ABSTRACT

Water is treated with sound waves produced by means of a submerged plasma sparking device (16) to mitigate detrimental effects of aquatic organisms in the water. For example, the incrustation of zebra mussels may be reduced by killing the zebra mussels or creating an environment hostile to them. The plasma sparking device may have a main storage circuit (14) which includes liquid dielectric capacitors or cryogenically cooled field coils for storage. Moreover, the electrodes (50) of the plasma sparking device may be of aluminum or an aluminum alloy.

41 Claims, 6 Drawing Sheets

ZEBRA MUSSEL (DREISSENA POLYMORPHA) AND OTHER AQUATIC ORGANISM CONTROL

TECHNICAL FIELD

This invention relates to a method and apparatus for inhibiting or reducing the build up of incrustation of aquatic organisms in an underwater environment. In particular, the invention relates to a method and apparatus for inhibiting or reducing undesirable incrustations of zebra mussels over a defined area by means of acoustical pulses produced by a plasma sparking device sometimes also referred to as a "sparker", "plasma gun" or "plasma jet".

BACKGROUND ART

The propensity of certain marine organisms like mollusks to affix themselves to man-made underwater objects has long been a difficult and expensive problem for organizations engaged in marine operations. The most well-known aspect of the problem is the fouling of ships' hulls by marine organisms which can materially retard the progress of a vessel through water. Recently, a more celebrated aspect of the problem has occurred with the invasion of the Great Lakes by a non-indigenous mollusk known as the zebra mussel.

At maturity, the zebra mussel is only a few inches long but it proliferates at a tremendous rate, forming massive colonies on underwater objects. Of most immediate concern has been the way in which these colonies have collected around water intake pipes for hydroelectric projects and municipalities, retarding the flow of water and even threatening to block it.

So far the only proven method for controlling the growth of the mussels at water intakes has been the use of chemicals, particularly chlorination. This, however, has proved to be clumsy, expensive and of some potential hazard to the underwater environment.

Also, on the Great Lakes there has been growing concern, resulting in the introduction of controls, about the use of chemicals in anti-fouling paints for the hulls of vessels. It has been concluded that some of the most effective chemicals used in these paints may be having an adverse effect on the marine environment and water quality.

Much thought, therefore, has been given to the development of a practical means of generating acoustical pulses to kill or control unwanted aquatic animals like zebra mussels in specifiable or highly localized areas. It is well known that the acoustical shock wave of an underwater explosion can locally kill or stun aquatic animals. An acoustical pulse, generated by similar or other mechanical or electrical means, can have the same local effect.

Finding a practical and controllable method of generating acoustical energy that will adversely affect unwanted aquatic organisms has been difficult. The use of explosive or mechanical underwater acoustical generators has foundered due to the inability of researchers working with these devices to solve one or several problems involving repeatability, controllability, cost, complexity, bulkiness, efficiency and general effectiveness. For instance, the one-inch air gun which is used to generate acoustical pulses requires a floating platform equivalent to a tug. This makes it vulnerable to the hazards of weather and the sea while limiting how near it can be brought to the underwater target area. The pulses it produces are also spread over a broad band of frequencies thereby limiting the energy available to those frequencies that may be found to have the optimum deleterious effect on the target organisms.

Electrically operated underwater acoustical generators, however, have existed for many years. They were developed to provide variable sound sources for the seismic exploration of bodies of water and their underlying sediments. One category of these devices involves the creating of an electric arc between two electrodes which, in effect, closely resembles a tiny explosion of TNT which breaks down the gas or water at the electrodes (creating a "plasma") and generates an acoustical pulse. Known as sparkers or plasma guns, early versions of these devices have required high voltages when submerged to ionize the water and create the arc, or mechanical techniques to provide a conductive passage between the electrodes.

Recent improvements in plasma gun design have made it a much more efficient and practical source of acoustical energy. Canadian Patent 1,268,851 by Reginald Clements et al involves feeding gas to the cavity where the arc is to occur and a means whereby the cavity can be enlarged or diminished to control the size of the plasma plume created at discharge. This makes it possible to control the wavelength of the acoustic pulse generated by the spark which is also controlled by the voltage and current supplied to the electrodes.

A plasma gun can be likened to an automobile spark plug in which the nature of the spark can be controlled by the separation of the electrodes and the amount of current and voltage that is supplied to them. In an underwater application, water may be expelled from around the electrodes and replaced by a gas before the arc or spark is created. Alternatively, sufficiently high voltage may be applied to the electrodes from a separate trigger circuit to overcome the high breakdown voltage of fresh or salt water. And like a spark plug, a plasma gun can be fired repeatedly at a high rate, e.g. one pulse per second.

The plasma gun is attractive for underwater acoustical imaging or seismic exploration because it can be operated at will over a broad range of acoustical frequencies with pulses on far narrower band widths than available from mechanical acoustical generators like air guns. It can also generate acoustical pulses at high amplitudes and specific wavelengths. This has many advantages in terms of acoustical and seismic imaging.

DISCLOSURE OF THE INVENTION

The plasma sparking device or plasma gun was developed for underwater exploration but I have discovered it to be the embodiment of a novel method for inhibiting or reducing incrustation of aquatic animals like zebra mussels, or other aquatic organisms, over limited and previously defined areas without adversely affecting the larger underwater environment or water quality. It has advantages over all mechanical devices for generating acoustical energy in that it may have a high rate of repeatability, efficiency, and operates over a broad range of energies. Two or more plasma guns operating in concert can also be made to produce acoustical pulses separated by time intervals adjusted to the physical dimensions of the target organisms in order to maximize biological damage. In other words, permanent damage can be caused to an organism if it is struck by another acoustical pulse before it has had a chance to recover from the effects of the preceding one. It may also be compact, lightweight, simple of construction and of operation, can be installed underwater close to the target area, and can be operated remotely.

To achieve the desired effect of killing or controlling aquatic organisms, the mechanical components of a plasma gun consisting of the electrode or electrodes, insulator and outer casing can be installed underwater next to the target area. These components will weigh at most only from two to a hundred pounds. Gas and electricity can be supplied to the unit remotely, either from shore or from a small floating platform moored above. Where necessary due to the mechanical tunability of the device, achieved by varying the size of the cavity where the arc occurs, more than one plasma jet can be installed in the target area. Otherwise, control of the wavelength, frequency and energy of the acoustical pulses from the plasma gun will be managed remotely.

In underwater applications, the more successful plasma sparking device designs generally consist of a casing with a chamber at one end in which the electrodes are located. This chamber—the spark discharge cavity—has a port which opens to the medium (water, in this case) to allow egress of the plasma plume when the device is fired by activating the main storage circuit, thereby creating the acoustical pulse.

Hitherto, relatively low-energy acoustical pulses have been adequate where plasma sparking devices have been intended for underwater acoustical imaging or similar seismic applications. These have been obtained in one of the more recent designs by using a suitable number of storage capacitors to accumulate electrical energy and discharge it at rather low voltages (0.8 to 5 Kv) and at fairly modest energy levels (up to $1 \times 10^3$ Joules). Discharge at these voltages is assisted by a trigger spark across the gap generated by a separate electrical circuit (a "trigger circuit" rather than the main storage circuit) of high voltage (10s of Kv) and low energy (<1 Joule). (See Canadian Patent No. 1,268,851, patented 1990/05/08, by R. M. Clements et al.)

It should be noted that existing plasma sparking source designs intended for underwater acoustical applications usually have as one of their objects (expressed or implied) provision as necessary for energy discharge sources of high voltage (15 to 30 Kv) at low currents (100 milliamps) or comparatively lower voltages (up to 5 Kv) at somewhat higher currents (1,500 amps). Those designs employing high voltage at low currents have done so where it has been seen to be necessary to overcome the high breakdown voltage of seawater. Much thought has been given to ways of introducing more conductive substances between the electrodes to permit sparking at lower voltages.

In other words, a design motive of previous plasma sparking devices intended for aquatic seismic applications has been to try to avoid incorporating discharge circuits which specifically or of necessity combine high voltages and high current values. It would appear, indeed, that there is a perceived (though undefined) spread of acoustical pulse energies that is adequate to meet most of the field requirements of underwater acoustical range finders without having to resort to building circuits capable of the rapid discharge of high energy sources (more than 1,000 Joules) at moderate to high voltages (2-plus Kv).

Where a plasma sparking device is to be used to generate locally destructive or lethal underwater acoustical pulses, however, the idea is to produce repeatable acoustical pulses that are as powerful as possible. This is best achieved if the plasma plume is created by rapid-discharge energies which combine high voltage and high current. I have found that this requirement is best met by employing high current/high voltage capacitors in the storage circuit of a plasma sparking device. I have also determined that cryogenically cooled superconducting field coils also can be used for this purpose, although present designs do not appear to be as practical in this regard as the high voltage/high current capacitors employing liquid dielectric and generally known as "oil-filled".

The "oil" in oil-filled capacitors may be a liquid dielectric (polychloride biphenyl or alkylbenzene, for instance) which enables a capacitor to be constructed in such a manner for it to have large internal conductors which optimize energy storage (200-plus microfarads) and permit rapid discharge. The latter, which also vitally contributes to the power of the resulting plasma plume, can be achieved by use of a thick nichrome (nickel-chromium) wire of low resistance (preferably 0.2 to 0.8 ohms). The resulting discharges can then be of the order of 25,000-plus amps at 5-plus kilovolts. Currently available capacitors of a construction other than oil-filled are likely to be damaged or destroyed by this method of discharge at these energies.

Oil-filled capacitors (and cryogenically cooled superconducting field coils) do not have many industrial applications as few electrical or electronic devices require the very large energy pulses that they are capable of. They are more likely to be found in the electrical systems of nuclear or high-energy research installations. They are not necessary for the successful operation of a plasma sparking device when used for underwater acoustical ranging or imaging. Consequently, when plasma sparking devices are intended for underwater use, their storage systems utilize non oil-filled capacitors which have fairly modest energy storage and discharge capabilities.

It has been further found, by experiment with plasma sparking devices, that when the spark discharge occurs between aluminum or aluminum alloy electrodes, the power of the resulting plasma plume is considerably enhanced. It appears that by vaporizing, the aluminum becomes part of the ionized gas of the plume which otherwise would consist mainly of hydrogen and oxygen. To compensate for the metal the electrodes lose with each discharge, they are made as "feeding electrodes" whereby the aluminum wire for each of them can be continuously advanced into the discharge cavity of the device or directly into the water medium.

When the technological innovations described above are incorporated into a liquid,immersed plasma sparking device, the very powerful acoustical pulses so obtained have a variety of novel applications. These including killing, damaging or otherwise controlling unwanted marine organisms like zebra mussels, sterilizing fluids, separating liquids and solids in suspension, and the breaking up of submerged solids like sewage sludge.

The fact that a plasma gun installed underwater can be controlled from the surface will enable an operator to determine by experiment the optimum wavelength, amplitude and frequency of acoustical pulse needed to achieve the desired effect of killing or controlling specific aquatic animals in the target area. It should also be possible to find an optimum pulse frequency, wavelength and amplitude at which mechanical damage is inflicted on the target animal at various stages in its growth (or possibly even aquatic plants and single-cell organisms) within a distance from the electrodes determined by the amount of energy supplied. Also, the operator will have the choice of having one or more of the devices fire at low energy at a high rate of repetition if this is found to be a suitable way in which to deter aquatic animals from colonizing the target area.

Thus, the plasma sparking device embodies an economical, practical and flexible means of dealing with unwanted aquatic organisms in an underwater environment within a limited and specified area.

MODES OF CARRYING OUT THE INVENTION

Embodiments of the invention will now be described by way of example with reference to the drawings in which.

In the drawings, a plasma sparking device for submerged operation comprises a main storage circuit 14 and a trigger circuit 12. When activated, an initial high voltage/low current discharge and then a high current discharge at a lower voltage occur at the electrodes. Both a plasma plume of high temperature ionized gas and an acoustical pulse result. The plasma plume produces UV radiation.

Figure 1:
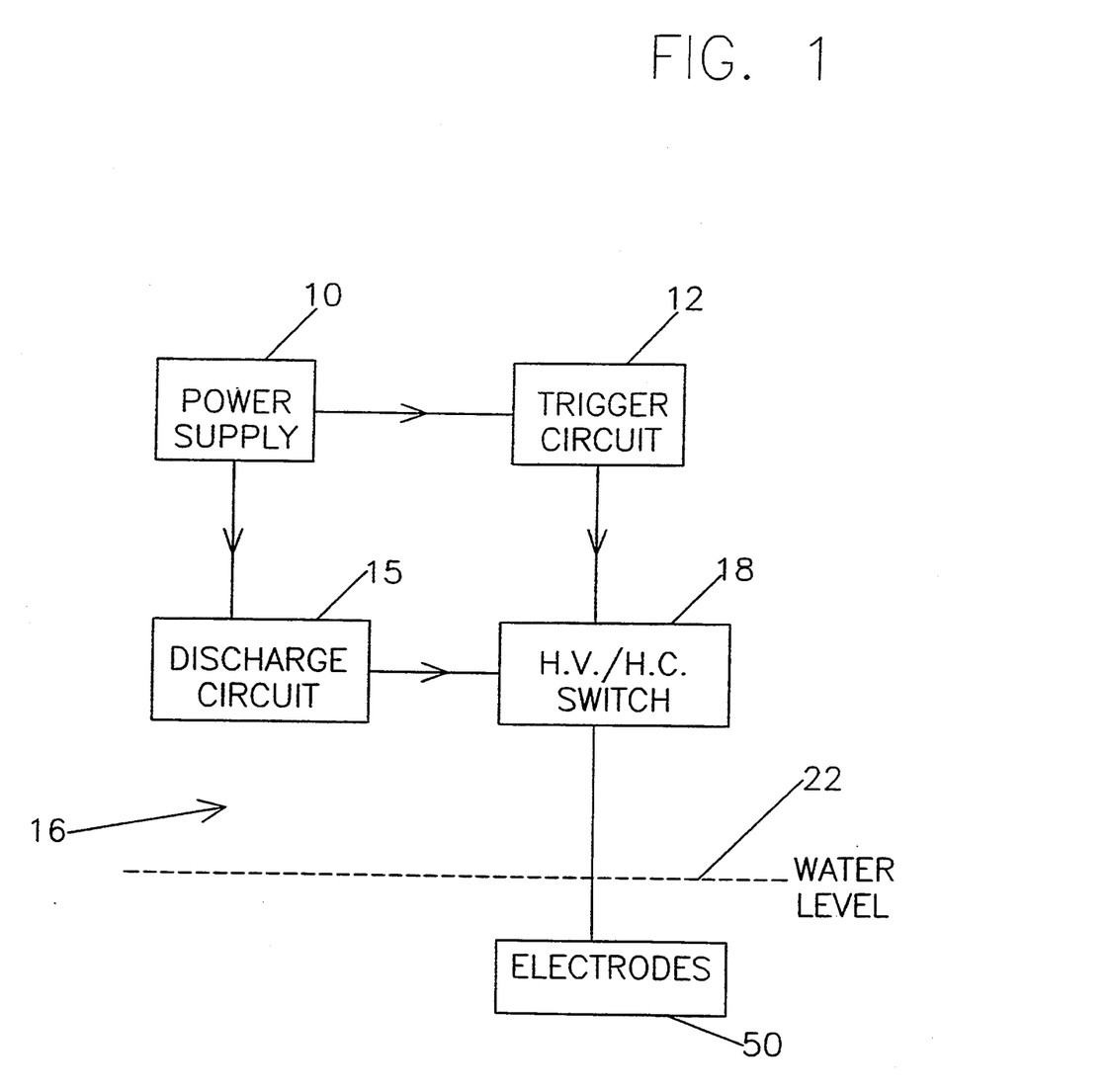
FIG. 1 is a block diagram of a submersible plasma sparking device which may be used in a process according to the present invention.
Figure 2:
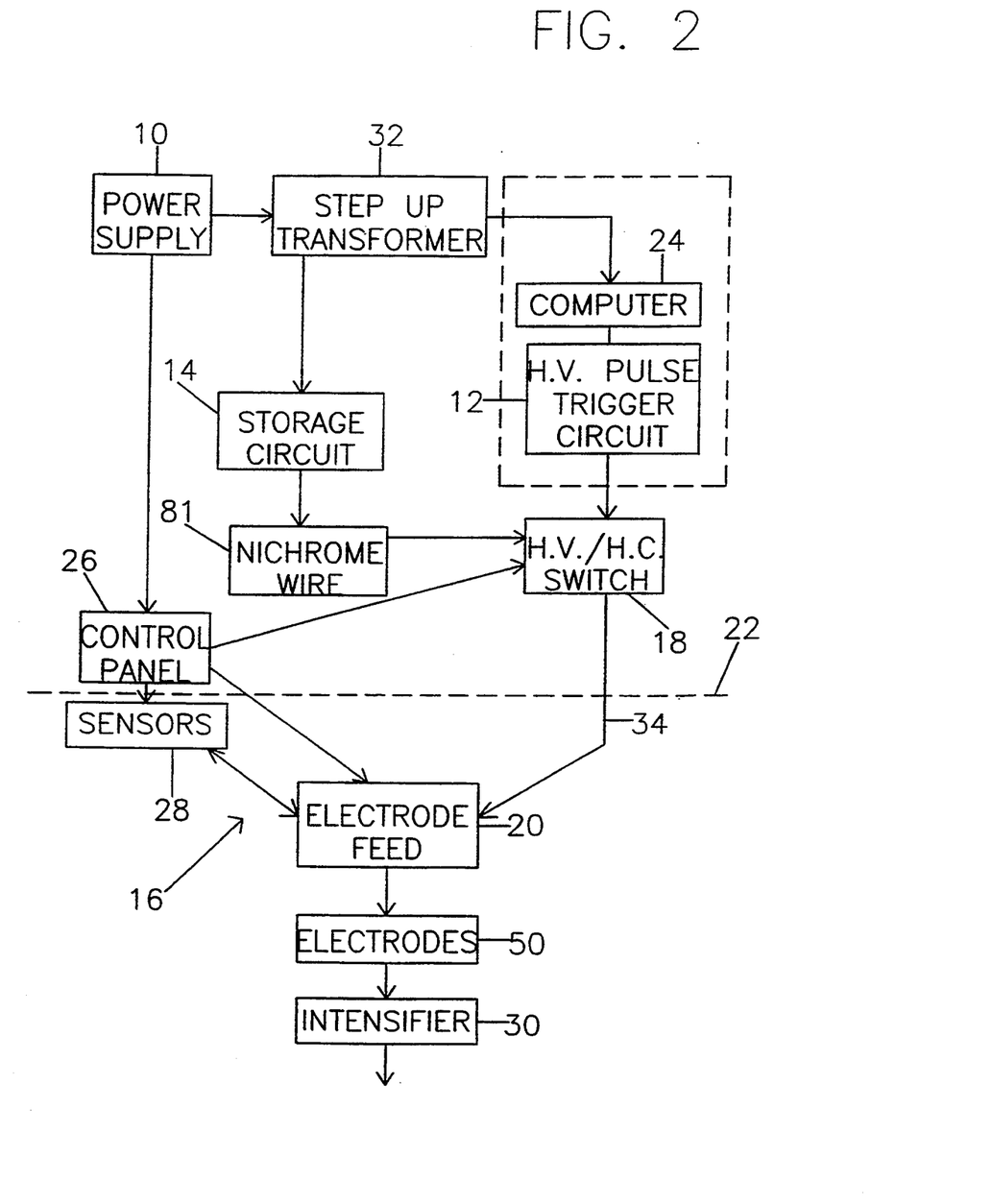
FIG. 2 is a view of one more detailed plasma sparking device according to the invention.

In the drawings, FIG. 1 indicates a simplified system in which a plasma sparking device comprises a power supply 10, a discharge circuit 15 having a main storage circuit 14 and nichrome wire 81 shown in FIG. 2, a trigger circuit 12, and a high voltage/high current switch 18. When activated by the switch 18, the trigger circuit 12 supplies a high voltage (but low current) discharge to the electrodes 50 sufficient to cause a breakdown of the medium (in this case, water or air) between them and an initial spark occurs. This, in turn, enables the high voltage/high current discharge from the main storage circuit 14 (also activated by switch 18) to bridge the gap at the electrodes and create a plasma plume. The result is a shock wave (acoustic pulse) and the provision of UV light below water level 22.

In practice, the power supply may be connected to a step up transformer 32 which may include a voltage divider and rectifier so that appropriate DC power may be directed to each of the trigger circuit 12 and the main storage circuit 14.

Storage circuits in plasma guns intended for operation under water usually include a number of storage capacitors to accumulate electrical energy for discharge, Such a plasma gun is described for use for profiling the ocean floor in an article by Pitt et al in Geophysical Prospecting 36, 523-536, 1988.

The process of the present invention is for a different purpose to that described by Pitt et al and modifications to Pitt's apparatus may be appropriate. At least in preferred embodiments of greater effectivity, the apparatus of the present invention should produce acoustic pulses as powerful as possible. Thus, the plasma plume should be created by the use of high voltage and high current from the main storage circuit 14 which includes banked capacitors or other reactants. Thus the storage facility of the main storage circuit 14 should be as high as possible. The storage facility may be provided by banked capacitors. Such capacitors should have a capacity as high as possible and thus, oil filled capacitors having a capacity at least as high as 200 microfarads may be used. Alternatively, cryogenically cooled superconducting field coils may be used. Other storage means may be possible.

Whatever the storage means, a suitable discharge from the storage means to a high voltage/high current switch 18 is controlled by use of a relatively low resistance wire 81 which may, as illustrated in FIG. 2 be a nichrome wire and have a resistance in the region of 0.6 ohm. Nichrome may be a preferred material due to its thermal characteristics. A general range of suitable resistance may be in the region of from 0.2 to 0.8 ohm. A high voltage trigger pulse from trigger circuit 12 under control of computer 24 is supplied to switch 18.

After leaving the HV/HC switch 18, current from either the trigger circuit 12 or main storage circuit 14 arrives first at the electrode feed mechanism 20 and then at one of the electrodes 50, the other being ground. The resulting plasma plume may be optionally enhanced by intensifier 30 which can be a non,imaging concentrator used as a reflector (see "Non-imaging Optics" in Scientific American, March, 1991) or a nozzle made of heat resistant material and having a suitable geometrical configuration similar to such used on jet or rocket engines. The overall device is to be operated from process control or control panel 26 which may be supplied with data from sensors 28 located on the submerged portion of the device to control the feeding electrodes or some distance therefrom to monitor the acoustic pulses.

Figure 3:
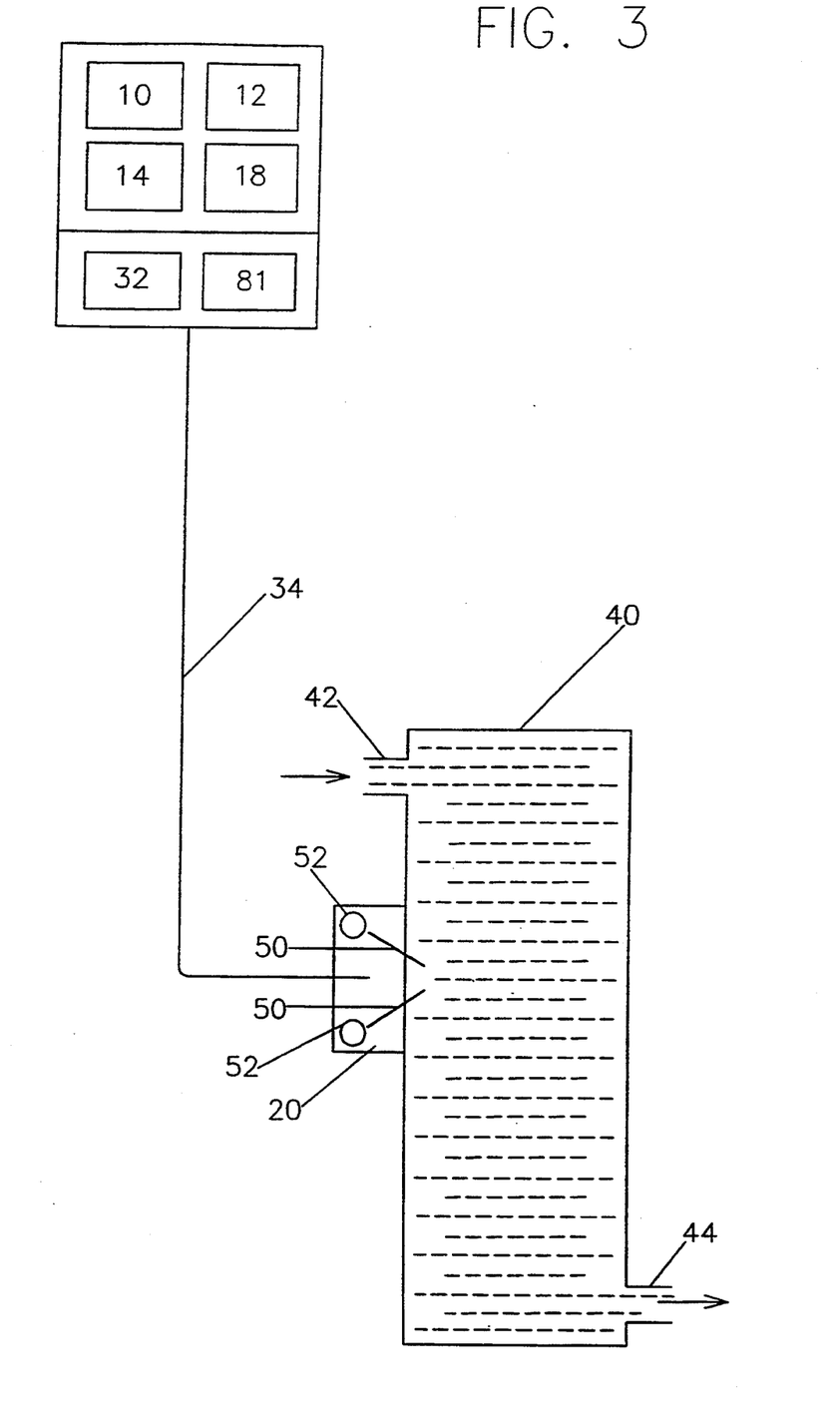
FIG. 3 is a schematic of the apparatus in use in a water tank.

In practice, the apparatus may be laid out as schematically shown in FIG. 3. The power supply 10, the trigger circuit 12, the storage circuit 14, and the high voltage/high current switch 18, together with the transformer 32 and nichrome wire 81 may be located above the water level and remote from the electrodes 50 and the feeding mechanism 20 therefor. The electrodes 50 and feeding mechanism 20 therefor may be located, when used for zebra mussel control, on a conduit for water where zebra mussels tend to congregate. For experimental purposes, an electrode feed and electrodes were arranged to operate in a water tank 40 having a water inlet 42 and a water outlet 44. The tank 40 provided a column of water about 1 meter high and from 8 to 16 inches in diameter. Only one sparker was used but it is envisaged that several sets of electrodes might be provided round the diameter of a tank such as tank 40 or around the perimeter of a water inlet or outlet. For experimental purposes, the dwell time of water in the tank was in the region of one minute.

Energy from the trigger circuit 12 and main storage circuit 14 was transmitted to the electrodes 50 through transmission line 34. The shielding 35 on transmission line 34 may be of any conventional material and may be earthed as shown in FIG. 4.

Figure 4:
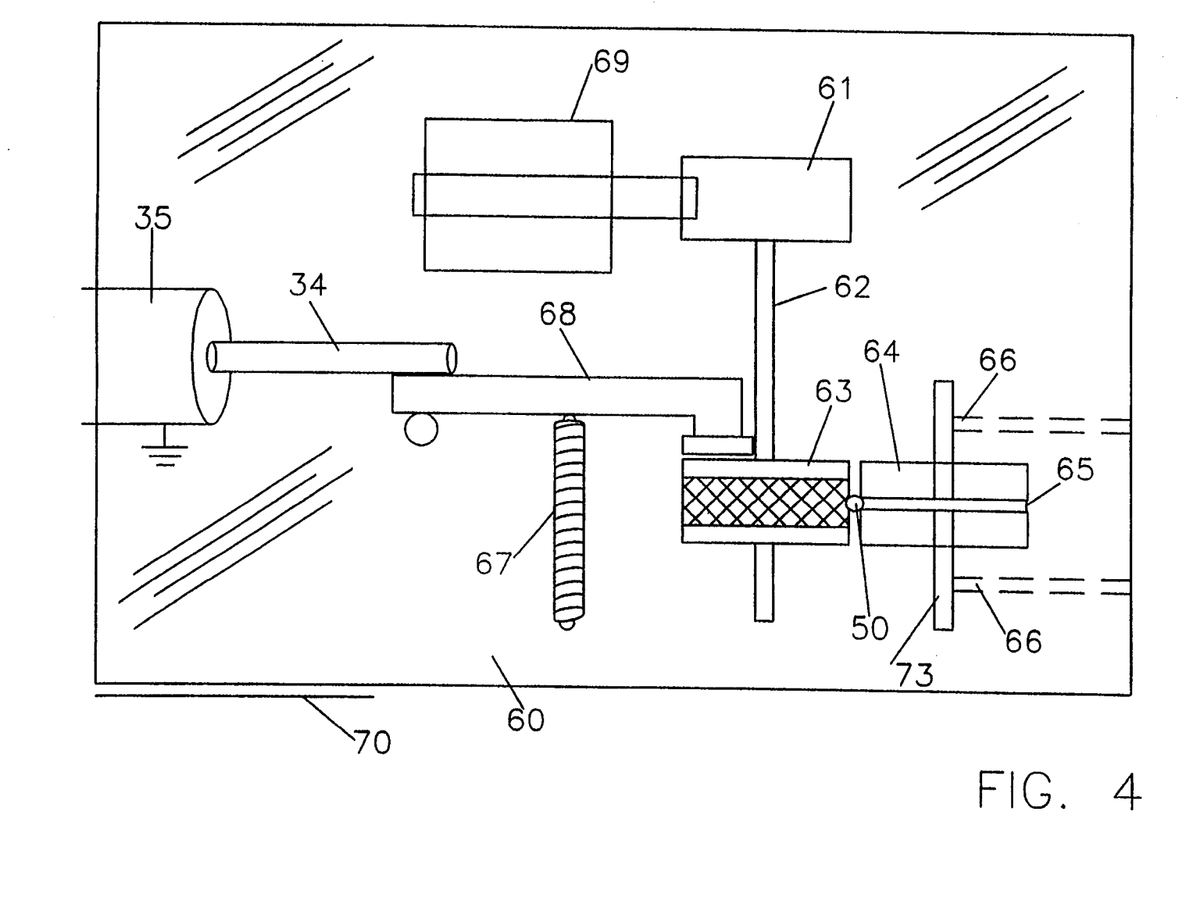
FIG. 4 is a schematic view of feed mechanism for replenishing the electrodes.
Figure 5:
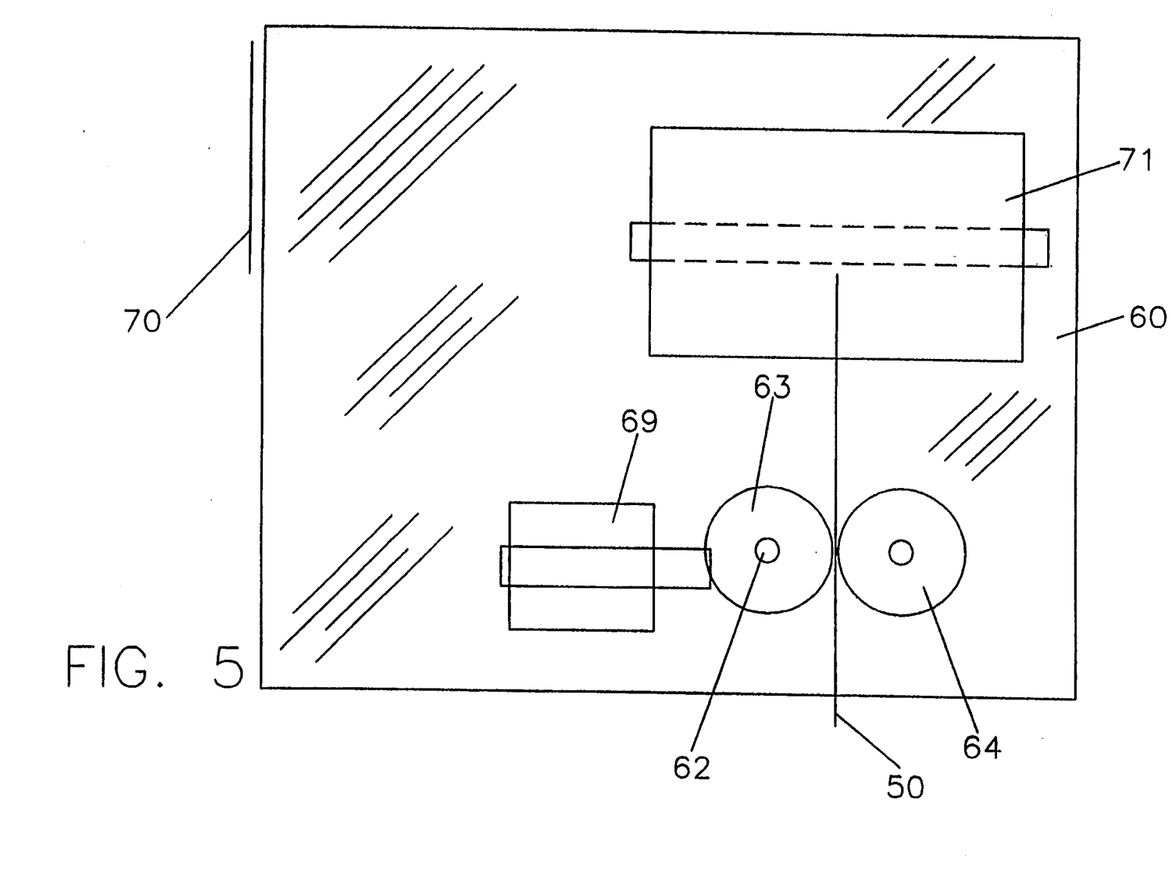
FIG. 5 is another view from the top of the mechanism for replenishing the electrodes.

FIGS. 4 and 5 show one suitable electrode feed mechanism for the plasma sparking device. The feed mechanism may be utilized with any material of electrode but it has been found that aluminum or aluminum alloy electrodes are particularly beneficial. The electrode feed mechanism is wholly set in a block of plastics material to protect it from water. It may be positioned on the outside of tank 40 so that electrodes 50 project into the tank. Electrodes 50 may be formed of aluminum wire drawn from spools 71 by means of a co-operating drive wheel 63 and idler wheel 64. Drive wheel 63 is provided with a roughened surface to engage electrode 50 and idler wheel 64 is provided with a groove 65 to position electrode 50. Idler wheel 64 is mounted on a shaft 73, the position of which may be adjusted by adjustment screws 66 to provide an appropriate amount of friction on electrode 50 between wheels 63 and 64. Drive wheel 63 may be driven through a ratchet assembly 61 by means of a solenoid 69. Transmission line 34 enters the plastic block 60 complete with its shielding 35 forming a water-tight entry point into block 60. Once inside the block 60, the shielding 35 ends and the transmission line 34 has a bare wire end engaging a contact lever for electrode 50. The contact lever 68 is biased into contact with both the transmission line and the electrode 50 by means of spring 67. The entire plastic block 60 is shielded by metal shield 70 extending therearound, although, for simplicity, only a portion of metal shield 70 is shown.

Figure 6:
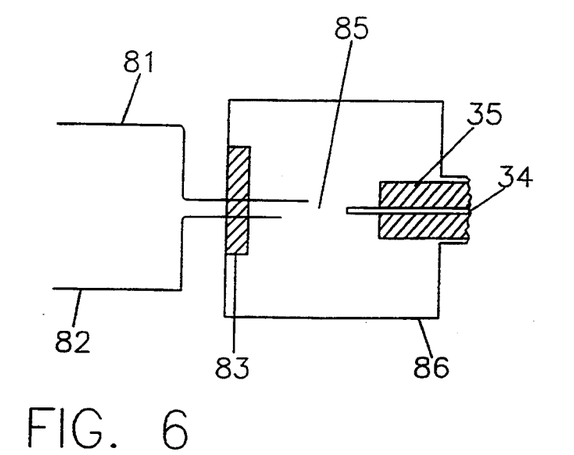
FIG. 6 is a view of one type of high voltage/high current switching apparatus.

The high voltage/high current switch 18 may be a conventional air spark gap as shown in FIG. 6. In this case, the spark gap mechanism of the switch 18 comprises an incoming high voltage pulse line 82 from trigger circuit 12 and low resistance wire 81 entering a sparking cavity 85 via insulation 83. Transmission line 34 leaves the sparking gap cavity shielded with co-axial double shielding 35 to provide protection from radiation.

Figure 7:
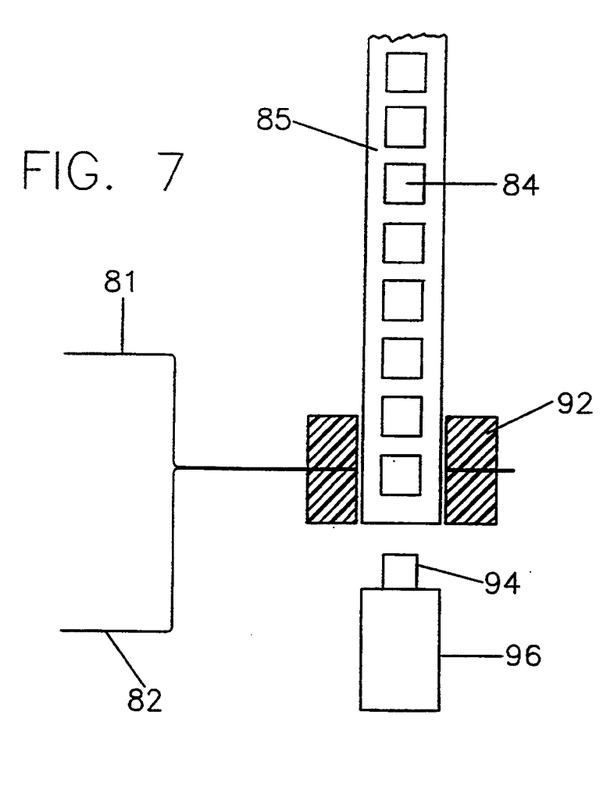
FIG. 7 is a view of another form of high voltage/high current switching apparatus.

An alternative switching mechanism is also shown in FIG. 7. This involves the use of ceramic blocks 84 in the gap. Blocks 84 are fed down a channel 85 by means of piston 94 activated by solenoid 96. Each ceramic block 84 is utilized for a chosen number of pulses before it is replaced by another block. Generally, each ceramic spark gap 84 may last for several hundred thousand pulses. The control of solenoid 96 and piston 94 for the movement of blocks 84 and channel 85 may be under the control of control panel 26.

Sensors 28 may be provided to position the electrode idler wheel 64. These sensors may be fibre optic sensors or any other suitable sensors.

Embodiments of the invention are envisaged of being of practical use in the provision of clean, at least partially sterilized water by means of treating water with both acoustic radiation and UV light by means of a plasma sparking device discharging directly into the water. Such a process may also be used for treating other liquids.

I claim:

1. A method of inhibiting or reducing the build up of aquatic organisms within a submerged locality, comprising: generating submerged acoustical pulses within the locality by repeatedly discharging a plasma sparking device over a period of time in the submerged locality to produce acoustical pulses such that the combined energy discharge is in the order of 25,000-plus Amps at 5,000-plus Volts DC.

2. A method as claimed in claim 1, in which the plasma sparking device comprises at least one high voltage/high current capacitor connected in series or in parallel in a main storage circuit producing the combined energy discharge, and comprises a discharge wire having a resistance from 0.2 to 0.8 ohms and leading to paired submersible sparking electrodes separated by a sparking gap.

3. A method as claimed in claim 1, in which the plasma sparking device comprises at least one high voltage/high current cryogenically cooled superconducting field coil connected in series or in parallel in a main storage circuit producing the combined energy discharge, and comprises a discharge wire having a resistance from 0.2 to 0.8 ohms and leading to paired submersible sparking electrodes separated by a spark gap.

4. A method as claimed in any one of claims 2 to 3, in which the electrodes of the plasma sparking device are made of aluminum or an alloy thereof.

5. A method as claimed in any one of claims 2 to 3, in which the discharge wire is a nickel-chromium wire.

6. A method as claimed in any one of claims 1 to 3, in which the acoustical pulses are effective to kill or damage the aquatic organisms or otherwise to control them by limiting their ability to grow or colonize a defined area.

7. A method as claimed in claim 6, in which the aquatic organisms are zebra mussels.

8. A method as claimed in claim 6, in which the aquatic organisms are plants.

9. A method as claimed in claim 6, in which the aquatic organisms are single-cell organisms.

10. A method as claimed in claim 6, in which the spark discharge occurs in a spark discharge cavity in the plasma sparking device which is vented at one end to allow egress of an ionized plasma plume of a liquid into which the plasma sparking device discharges.

11. A method as claimed in claim 6, in which the plasma sparking device is operated remotely.

12. A method as claimed in claim 6, in which the electrodes of the plasma sparking device are made of aluminum or an alloy thereof.

13. A method as claimed in claim 6, in which the discharge wire is a nickel-chromium wire.

14. A method as claimed in claim 6, in which the acoustical pulses so generated are intended to serve to sterilize a liquid, separate solids or liquids in colloidal suspensions or to break up solids and liquids immersed in liquids.

15. A method as claimed in claim 6, in which two or more plasma sparking devices are made to produce acoustical pulses such that the time intervals between them are adjusted to the physical dimensions of the target organisms in order to maximize biological damage.

16. A method as claimed in any one of claims 1 to 3, in which the aquatic organisms are zebra mussels.

17. A method as claimed in claim 16, in which the spark discharge occurs in a spark discharge cavity in the plasma sparking device which is vented at one end to allow egress of an ionized plasma plume of a liquid into which the plasma sparking device discharges.

18. A method as claimed in claim 16, in which the plasma sparking device is operated remotely.

19. A method as claimed in any one of claims 1 to 3, in which the aquatic organisms are plants.

20. A method as claimed in any one of claims 1 to 3, in which the aquatic organisms are single-cell organisms.

21. A method as claimed in claim 20, in which the plasma sparking device is operated remotely.

22. A method as claimed in claim 1 or claim 2, in which the plasma sparking device is used to sterilize water or other liquids.

23. A method as claimed in claim 22, in which the plasma sparking device sterilizes a liquid by discharging said device directly into the liquid and generating an ionized plasma plume of said liquid with both resultant UV radiation and acoustic pulses of a frequency detrimental to organisms, the presence of which is undesirable in the liquid.

24. A method as claimed in any one of claims 1 to 3, in which the spark discharge occurs in a spark discharge cavity in the plasma sparking device which is vented at one end to allow egress of an ionized plasma plume of a liquid into which the plasma sparking device discharges.

25. A method as claimed in claim 1 in which the plasma sparking device is operated remotely.

26. A method as claimed in any one of claims 1 to 3, in which the acoustical pulses so generated are intended to serve to sterilize a liquid, separate solids or liquids in colloidal suspensions or to break up solids and liquids immersed in liquids.

27. A method as claimed in any one of claims 1 to 3, wherein two or more plasma sparking devices are made to produce acoustical pulses such that the time intervals between them are adjusted to the physical dimensions of the target organisms in order to maximize biological damage.

28. A plasma sparking device for generating acoustical pulses in a liquid medium characterized by including at least one high voltage/high current capacitor connected in series or in parallel in a main storage circuit producing a combined energy discharge in the order of 25,000-plus Amps at 5,000-plus Volts DC, a discharge wire having resistance from 0.2 to 0.8 ohms and leading to paired submersible sparking electrodes separated by a spark gap, and means for replenishing the electrodes as they are consumed.

29. A plasma sparking device for generating acoustical pulses in a liquid medium characterized by including at least one high voltage/high current cryogenically cooled superconducting field coil connected in series or in parallel in a main storage circuit producing a combined energy discharge in the order of 25,000-plus Amps at 5,000-plus Volts DC, a discharge wire having resistance from 0.2 to 0.8 ohms and leading to paired submersible sparking electrodes separated by a spark gap, and means for replenishing the electrodes as they are consumed.

30. A plasma sparking device as defined in claim 28, in which the capacitors in the main storage circuit are liquid dielectric capacitors.

31. A plasma sparking device as claimed in any one of claims 28 to 30, in which the electrodes comprise aluminum or an alloy thereof.

32. A plasma sparking device as claimed in any one of claims 16 to 30, in which the electrodes are in a discharge cavity vented at one end to allow egress of a plasma plume.

33. A plasma sparking device as claimed in any one of claims 28 to 30, in which the discharge wire is a nickel-chromium wire.

34. A plasma sparking device as claimed in claim 28, in which the means for replenishing the electrodes comprises a spool of wound electrode wire, sensors, and control means to feed wire from the spool to replenish consumed electrodes.

35. A plasma sparking device as defined in claim 28, in which the at least one high voltage/high current capacitor is a 200-plus microfarad capacitor.

36. A plasma sparking device as claimed in claim 31, in which the electrodes are in a discharge cavity vented at one end to allow egress of a plasma plume.

37. A plasma sparking device as claimed in claim 31, in which the discharge wire is a nickel-chromium wire.

38. A plasma sparking device as claimed in any one of claims 29 to 30, in which the means for replenishing the electrodes comprises a spool of wound electrode wire, sensors, and a control panel means to feed wire from the spool to replenish consumed electrodes.

39. A plasma sparking device as claimed in claim 31, in which the means for replenishing the electrodes comprises a spool of wound electrode wire, sensors, and a control panel means to feed wire from the spool to replenish consumed electrodes.

40. A plasma sparking device as claimed in claim 32, in which the means for replenishing the electrodes comprises a spool of wound electrode wire, sensors, and a control panel means to feed wire from the spool to replenish consumed electrodes.

41. A plasma sparking device for generating continuously repeatable acoustical pulses in a liquid medium characterized by including at least one high voltage/high current capacitor connected in series or in parallel in a main storage circuit, a discharge wire leading to paired submersible sparking electrodes separated by a spark gap, means for replenishing the electrodes as they are consumed and control means for remotely controlling the replenishment of the electrodes, wherein the replenishing means and the control means provide the continuous repeated acoustical pulses.

* * * * *